April 26, 1960  F. P. EVANS ET AL  2,934,306
FLOW CONTROL VALVE FOR A FUEL SYSTEM OR THE LIKE
Original Filed May 2, 1957  4 Sheets-Sheet 1

INVENTORS
FREDRICK P. EVANS
CHARLES F. STEARNS

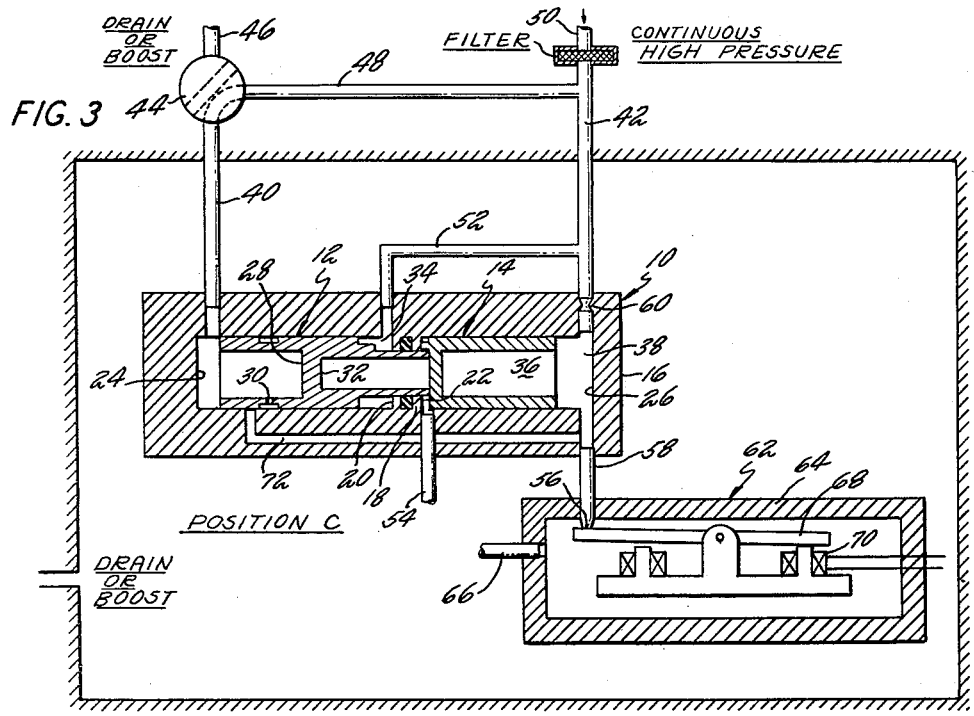
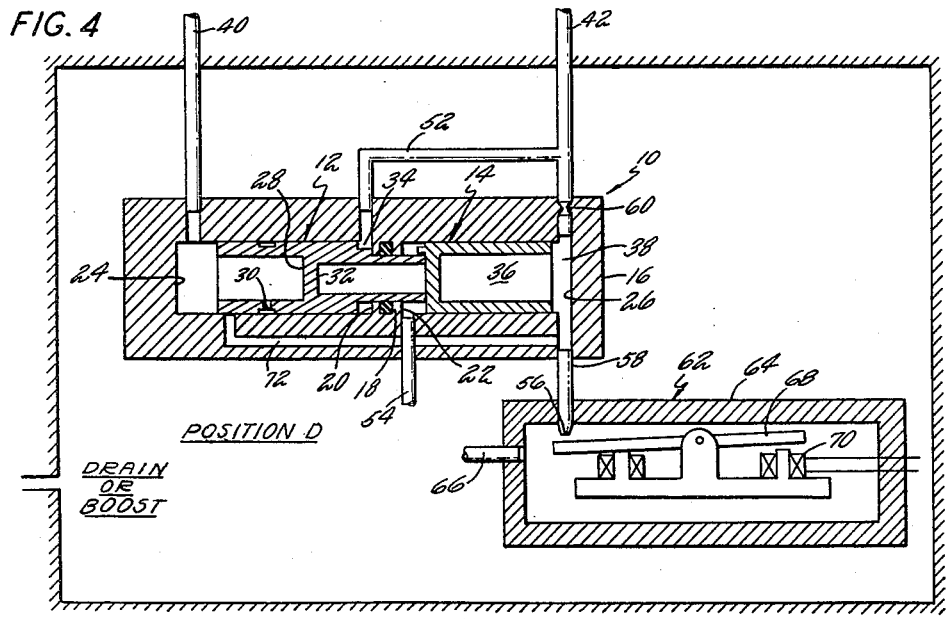

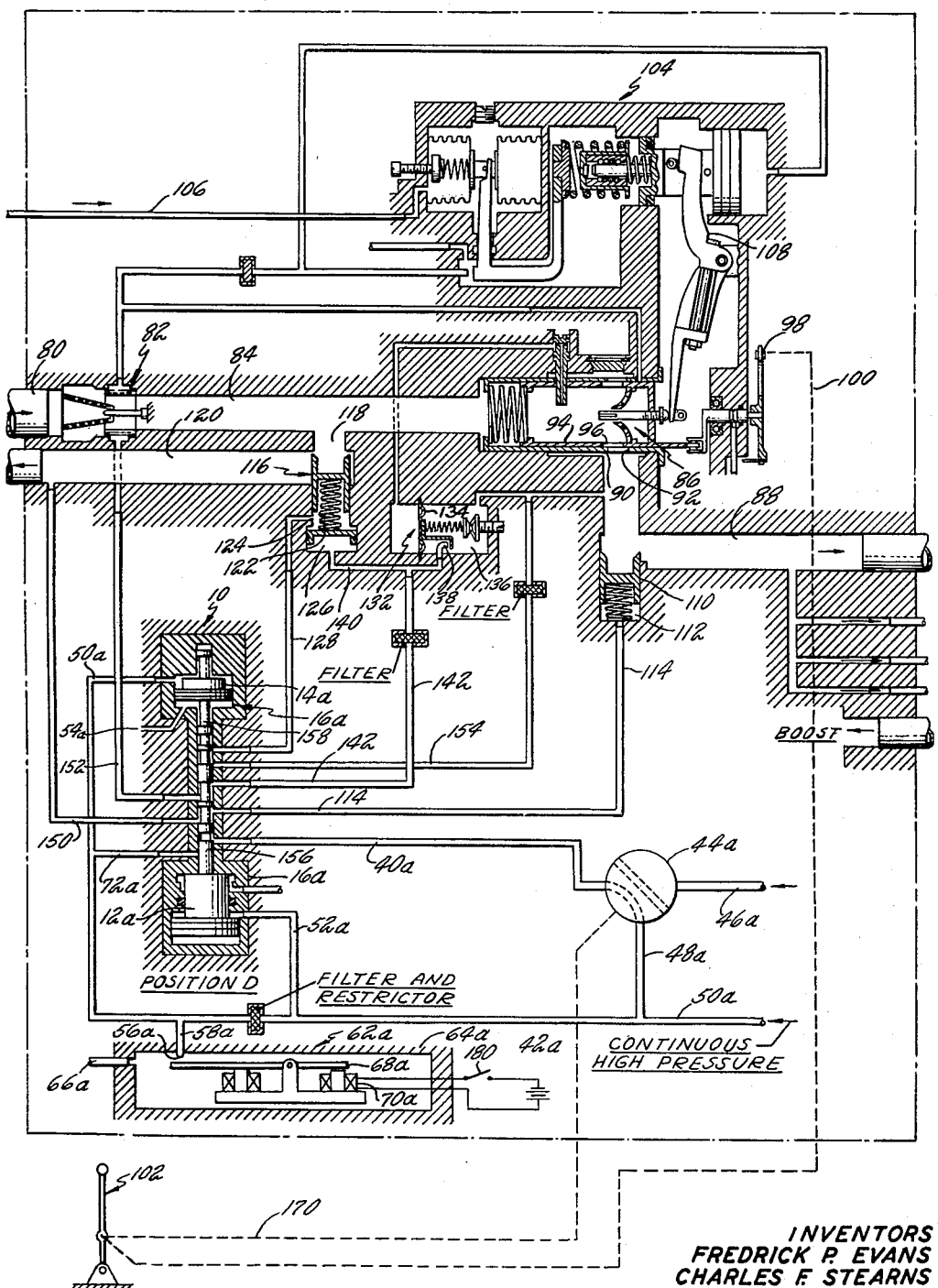

April 26, 1960 F. P. EVANS ET AL 2,934,306
FLOW CONTROL VALVE FOR A FUEL SYSTEM OR THE LIKE
Original Filed May 2, 1957 4 Sheets-Sheet 4
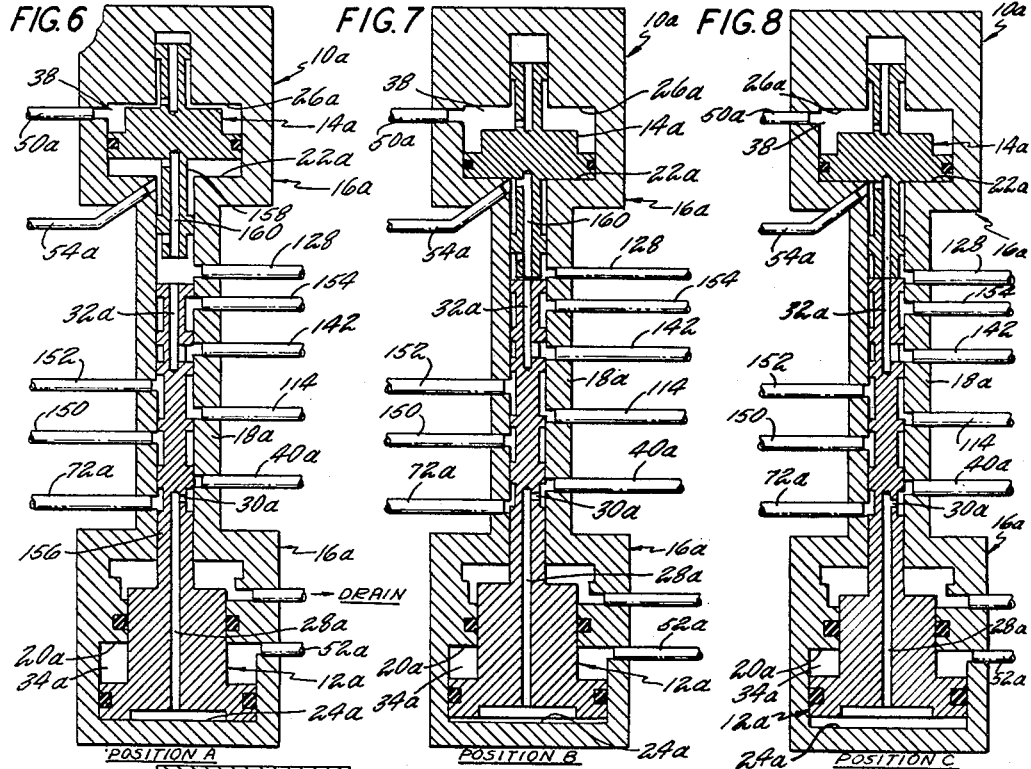
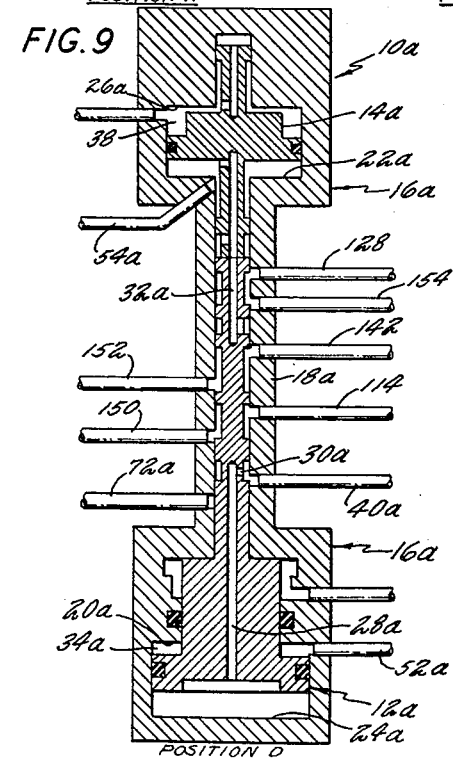
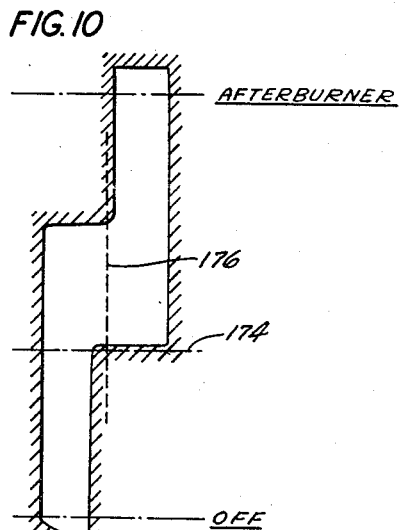
INVENTORS
FREDRICK P. EVANS
CHARLES F. STEARNS
BY Teller & McCormick
ATTORNEYS United States Patent Office 2,934,306
Patented Apr. 26, 1960

2,934,306

FLOW CONTROL VALVE FOR A FUEL SYSTEM OR THE LIKE

Fredrick P. Evans, Longmeadow, and Charles F. Stearns, East Longmeadow, Mass., assignors to United Aircraft Corporation, East Hartford, Conn., a corporation of Delaware Continuation of application Serial No. 656,582, May 2, 1957. This application November 6, 1957, Serial No. 696,585

9 Claims. (Cl. 251—28)

This invention relates to a flow control valve which may be employed to advantage in a fuel control system, and the valve is of a type having a plurality of valve shuttles which are movable to predetermined control positions responsive to fluid pressure signals from a plurality of independent control devices.

This application constitutes a continuation of our application Serial No. 656,582, filed May 2, 1957, now abandoned.

It is the general object of the invention to provide a control valve of the aforementioned type which is movable from one discrete control position to another but which cannot be moved from one of the discrete positions until a specific fluid pressure signal is received.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

Fig. 1 is a longitudinal sectional view of two shuttles disposed in a housing for movement longitudinally therein responsive to fluid pressures as controlled by two valve devices, also shown. The shuttles are movable into four discrete positions of interest herein, the "A" position being shown in Fig. 1. (These shuttles are to be incorporated in the construction of a control valve for a fuel system as shown in Fig. 5);

Fig. 3 is like Figs. 1 and 2 but shows the shuttles in the "C" position;

Fig. 4 is like the prior figures, but shows the shuttles in the "D" position;

Fig. 5 is a schematic illustration of an afterburner fuel control system for a jet engine, the system including a control valve incorporating a shuttle construction similar to that shown in Figs. 1-4;

Fig. 6 is a longitudinal cross-sectional view of the control valve shown in Fig. 5, the valve shuttles being in the "A" position similar to the position of the shuttles in Fig. 1;

Fig. 7 is similar to Fig. 6 showing the valve shuttles in the "B" position;

Fig. 8 is a similar view showing the valve shuttles in the "C" position;

Fig. 9 is similar to Figs. 6-8, but showing the valve shuttles in the "D" position; and Fig. 10 is a schematic view of the guide slot for the power control lever operating the fuel control system of Fig. 5.

Figure 1:
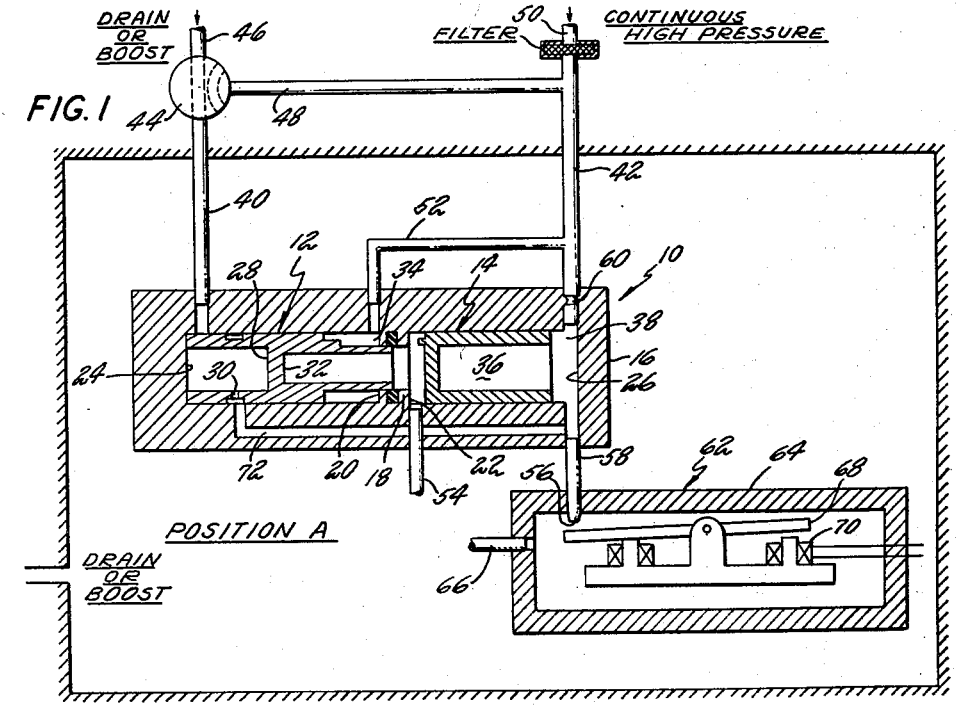

As will be more fully understood hereinafter, the present invention provides an improved control valve for a jet engine afterburner fuel control system, the control valve being a composite structure including two valve members which are axially or longitudinally movable within a housing responsive to fluid pressure signals controlled by two independent valve devices. The valve members are freely movable within the valve housing in shuttle-like fashion, and for convenience will hereinafter be referred to as "shuttles" or "shuttle valves." In keeping with the present invention, the shuttle valves are moved into four discrete positions responsive to fluid pressure signals controlled by the previously mentioned two valve devices. In further keeping with the invention and as an important feature thereof, the shuttle valves cannot be moved from one of the discrete positions to another unless or until a specific fluid pressure signal is introduced by one of the valve devices.

In order that the movement of the shuttle valves responsive to fluid pressure signals can be fully understood without reference to the valving operation resulting therefrom, the composite control valve 10 has been shown in Figs. 1-4 as including two shuttles 12 and 14 which do not have the valve ports, etc. which are to be provided for controlling flow in a fuel system or the like. In order that reference to the composite valve 10 including the shuttles 12 and 14 may not be confused with reference to other valves and valve devices, the said composite valve will hereinafter be referred to as a "sequencing" valve. The said sequencing valve includes a housing 16 which is closed at both ends but which has a bore slidably receiving the shuttles 12 and 14. The shuttles and the bore are preferably cylindrical and the bore is of reduced diameter between its ends to provide a radial projection 18 within the bore defining an internal shoulder 20 facing toward the shuttle 12 and an internal shoulder 22 facing toward the shuttle 14. As will be observed in Figs. 1-4, the shuttle 12 is movable longitudinally between the shoulder 20 and an end wall 24 of the housing 16, and the shuttle 14 is movable longitudinally between the shoulder 22 and the other end wall 26 of the said housing.

It will also be observed that the end of the shuttle 12 adjacent the end wall 24 of the valve housing is provided with a relatively deep cavity or first chamber 28 and that one or more radial ports 30 extend through the shuttle 12 into the said cavity. The other end of the shuttle 12 is also provided with a cavity 32 and is of reduced diameter so that in all positions of the shuttle an annular or second chamber 34 will be defined thereabout adjacent the shoulder 20. The shuttle 14 has a deep cavity or recess 36 opening toward the end wall 26 of the valve housing, and in all positions of the shuttle 14 to be considered herein, it is spaced from the said end wall to define a chamber 38.

The fluid pressure signals to the sequencing valve 10 are received through two conduits 40 and 42, the conduit 40 opening into the sequencing valve bore adjacent to, but nonetheless spaced from the end wall 24, and the conduit 42 opening into the bore adjacent the other end wall 26.

The signal conduit 40 is connected with a two-position valve device 44 which can selectively be positioned to connect the conduit 40 with conduit means 46 or with conduit means 48. For purposes of consideration here, the conduit means 46 may be considered to constitute an ambient pressure drain, but in a jet engine fuel control system the conduit means 46 may be connected with a low pressure fluid supply referred to as the "boost." The conduit means 48 is connected with a conduit 50 continuously receiving fluid at a substantially constant high pressure. Thus, depending upon the position of the valve 44, the conduit 40 carries a low or a high pressure signal.

The signal conduit 42 is directly connected to the high pressure conduit 50 and, therefore, the signal conduit 42 always provides a supply of high pressure fluid to the sequencing valve.

In addition to the aforementioned conduits, there is a branch conduit 52 extending between the annular valve chamber 34 and the high pressure signal conduit 42 whereby the said annular chamber is continuously supplied with fluid at high pressure biasing the shuttle 12 away from the shoulder 20 and toward the left as viewed in Figs. 1–4. A drain conduit 54 is extended through the valve housing 16 into the bore adjacent the internal shoulder 22 whereby to vent pressure from the bore between the said shoulder and the left-hand end of the shuttle 14. This permits free movement of the shuttle 14 toward the left responsive to fluid under pressure in the right-hand end chamber 38. The said chamber 38 receives fluid from the high pressure signal conduit 42, but pressure within the chamber is controlled by opening and closing an orifice 56 at the outer end of a vent conduit 58 extending through the housing 16 into the chamber 38. Opening and closing of the orifice 56 has no substantial affect upon the pressure in the signal conduit 42, the branch conduit 52 and the annular chamber 34, because a restriction 60 is provided in the signal conduit 42 adjacent its opening into the chamber 38. By opening and closing the vent orifice 56, the fluid pressure in the chamber 38 is changed substantially. The second valve device hereinbefore mentioned is utilized selectively to open and close the orifice 56, the said second valve device being solenoid operated and being indicated generally by the reference numeral 62.

The solenoid operated valve device 62 comprises a housing 64 receiving the vent conduit 58 having the orifice 56 and also receiving a drain conduit 66, whereby when the orifice 56 is open, the conduit 58 and the valve chamber 38 are in communication with drain. The orifice 56 is opened or closed by movement relative thereto of an armature 68 which is pivotally supported and operated by a solenoid 70. The armature-solenoid arrangement is preferably such that the armature 68 is moved by the solenoid 70 when energized to open the orifice 56 and, when the solenoid is de-energized, the armature inherently returns to closed position on the orifice or it is biased to the closed position by spring means or the like. Thus, when the solenoid is energized, the right-hand valve chamber 38 is vented and when the solenoid is de-energized, the chamber 38 is closed so that pressure builds up therein to shift the shuttle 14 to the left toward the shoulder 22. Opening and closing of the vent orifice 56 also controls pressure in a passageway 72 within the sequencing valve housing 16. It will be observed that the passageway 72 extends from the right-hand chamber 38 towards the other end of the bore receiving the shuttle 12.

As shown in Fig. 1, the valve devices 44 and 62 are respectively conditioned to connect the signal conduit 40 with drain and to vent the valve chamber 38 and the valve passageway 72. Under this control condition, the sequencing valve 10 receives a high pressure fluid supply only from the branch conduit 52 which is connected with the annular valve chamber 34. The presence of the high pressure fluid in the chamber 34 and the absence of high pressure fluid in the cavity 28 of the shuttle 12 causes the said shuttle to be moved toward the left and into engagement with the end wall 24. The absence of high pressure fluid on either side of the shuttle valve 14 leaves it in a neutral position as shown. This position of the shuttles 12 and 14 in the sequencing valve 10 has been designated as the "A" position and is occasioned only when the first valve device 44 is connected to drain and when the second or solenoid operated valve device 62 is energized to open the orifice 56.

It is important to observe that the shuttle 12 cannot be moved from the "A" position merely by changing the position of the first valve device 44 so as to connect it with the high pressure supply. That is, the signal conduit 40 is closed by the shuttle 12 in the "A" position and no change in the pressure in the signal conduit 40 can effect movement of the shuttle 12.

Figure 2:
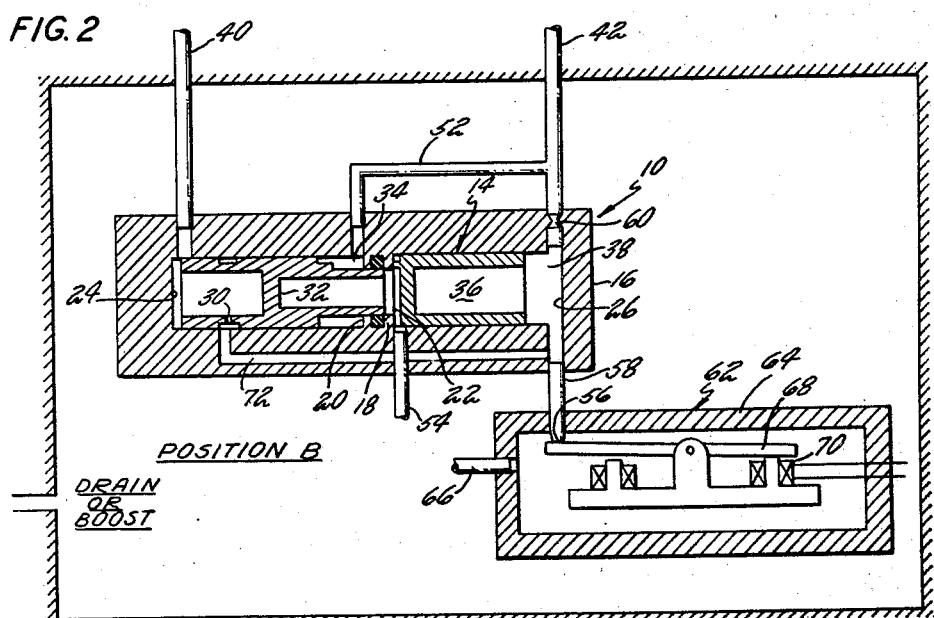
Fig. 2 is similar to Fig. 1, but shows the shuttles in the "B" position.

The shuttle 12 can be moved from the "A" position only by de-energizing the solenoid 70 whereby the second valve device 62 will be conditioned to close the orifice 56. When this is done, pressure will build up in the right-hand valve chamber 38 and in the valve passageway 72. The increased pressure in the chamber 38 will move the shuttle 14 toward the left against the shoulder 22 as shown in Fig. 2, and since in the "A" position of the shuttle 12 its end cavity 28 communicates with the passageway 72 through the port or ports 30, pressure will increase within the cavity 28 and bias the shuttle 12 toward the right. Thus, the shuttle 12 is acted upon by fluid under pressure in the cavity 28 and by fluid under pressure in the annular chamber 34, the pressure being substantially equal in the cavity 28 and in the chamber 34. However, since the fluid pressure in the cavity 28 acts upon the shuttle 12 over a greater area than does the fluid pressure in the annular chamber 34, the shuttle 12 will be moved toward the right. In moving toward the right, the shuttle 12 opens the inner end of the signal conduit 40 which is connected through the first valve device 44 to drain. This dissipates the pressure in the cavity 28 and the shuttle 12 tends to return toward the left. The shuttle 12 will reach a position of equilibrium wherein the dissipated fluid pressure in the cavity 28 acting over a greater area than the fluid pressure in the annular chamber 34 equals the effective force thereof on the shuttle 12. This is the "B" position of the shuttle 12 as shown in Fig. 2.

It is important to observe that the sequencing valve 10 can be moved from the "A" position into the "B" position only by closing the orifice 56 while the signal conduit 40 is connected through the valve device 44 to drain. It is also important to observe that the sequencing valve 10 can be returned to the "A" position from the "B" position only by opening the orifice 56.

The only way that the sequencing valve can be moved from the "B" position without returning to the "A" position is to shift the valve device 44 to connect the signal conduit 40 with the high pressure fluid source. This position of the valve device 44 is shown in Fig. 3. In such position of the valve device 44, the fluid pressure in the cavity or chamber 28 of the shuttle 12 will be increased to move the shuttle 12 toward the right from the "B" position. The shuttle 12 will move toward the right until its right-hand end engages the left-hand end of the shuttle 14 as shown in Fig. 3. In this position of the shuttle 12, the fluid forces acting thereon will be balanced. That is, the high pressure fluid force applied to the shuttle 12 within its cavity or chamber 28 and against the left-hand end thereof will be balanced by the high pressure fluid force applied against its shoulder in the chamber 34 and by the high pressure fluid force applied in the cavity 36 of the shuttle 14, the shuttle 14 resting against the shoulder 22 as shown. This position of the sequencing valve is designated the "C" position.

It is important to note then that the sequencing valve can be moved from the "B" position to the "C" position by switching the valve device 44 from drain to the high pressure supply while the orifice 56 remains closed. Obviously, the sequencing valve 10 can be returned from the "C" position to the "B" position merely by switching the valve device 44 so that it is connected with drain instead of with the high pressure supply.

The sequencing valve can also be moved from the "C" position to another or "D" position by opening the orifice 56 while leaving the valve device 44 connected to the high pressure supply. When the orifice 56 is opened with the sequencing valve in the "C" position, the high fluid pressure within the chamber 38 and the cavity 36 in the right-hand end of the shuttle 14 is vented. This permits the high pressure applied to the left-hand end of the shuttle 12 and in its cavity 28 to shift the shuttle 12 and the shuttle 14 toward the right to the position shown in Fig. 4. That is, the high pressure applied over the greater area at the left-hand end of the shuttle 12 overcomes the high pressure applied against its shoulder in the chamber 34.

Obviously, the shuttle 12 can be returned to the "C" position from the "D" position by closing the orifice 56 while the valve device 44 remains connected to the high pressure supply. It will also be obvious that the sequencing valve can be moved from the "D" position to the "A" position if the orifice 56 remains open and the valve device 44 is switched to the drain connection. This vents the pressure in the left-hand end of the shuttle 12 and within its cavity or chamber 28 so that the high pressure within the annular chamber 34 working on the shoulder of the shuttle 12 thrusts it to the left. No change is effected in the position of the shuttle 14.

From the foregoing description it should be understood that the sequencing valve 10 can be moved from one of its four discrete positions to an adjacent position only in response to a specific fluid pressure signal controlled either by the valve device 44 or the valve device 62. It should also be apparent that the sequencing valve 10 can be moved from one of its discrete positions to a position other than an adjacent position only by introducing a plurality of specific fluid pressure signals, this considering the A position to be adjacent the D position. The specific fluid pressure signals needed to move the sequencing valve from one position to another can readily be determined from the following table:

| If valve 10 is in position— | The pressure signals are— | And it can be moved to position— | By— |
|---|---|---|---|
| A | 44 to drain, 56 open | B | closing 56. |
| B | 44 to drain, 56 closed | C | connecting 44 to pressure. |
| B | 44 to drain, 56 closed | A | opening 56. |
| C | 44 to pressure, 56 closed | D | opening 56. |
| C | 44 to pressure, 56 closed | B | connecting 44 to drain. |
| D | 44 to pressure, 56 open | A | connecting 44 to drain. |
| D | 44 to pressure, 56 open | C | closing 56. |

Obviously, the aforedescribed structure can be adapted to operate as a valve by providing fluid pressure in the housing 16 and by providing lands and ports on the shuttles 12 and 14 to control flow from one or more of the said passages to one or more of the other passages. It is also obvious that the passages and valve lands, etc. can be arranged so that a selected flow condition through the valve 10 will exist for each of its four discrete positions and so that a switching in the flow conditions will take place with movement of the valve from one of its discrete positions to another.

In adapting the sequencing valve 10 for use in the afterburner fuel control system for a jet engine as shown in Fig. 5, the valve is adapted to be moved into each of the four discrete positions described above, but the valve lands and passages provided in the construction are so arranged that there is a change in the flow conditions through the valve only during movement thereof between the "C" position and the "D" position. The purpose of including the sequencing valve in the afterburner fuel control system is to prevent inadvertent or undesired afterburner operation.

The afterburner of a jet engine is utilized only when the engine power or thrust requirements are extraordinary, and the afterburner is not used under routine flight conditions as during cruise, etc. In the interests of control simplicity, it is preferred that one engine power or fuel control lever be used by the pilot to control engine operation under routine conditions and also during afterburner operation. Therefore, it is desirable to have means incorporated in the afterburner fuel control system and operable or controlled at least in part by the single power lever to prevent afterburner operation except when desired. The sequencing valve provided in accordance with the present invention provides the desired means.

It will be unnecessary in the understanding of this invention to describe in detail the construction and operation of all of the elements in the afterburner fuel control system shown in Fig. 5. The said system is supplied with fuel from an engine driven multi-stage pump means (not shown), the fuel being introduced to the system at a conduit 80. Having passed a filter indicated generally at 82, the fuel flows through a passage 84 to the inlet of a throttle valve 86 and, if the throttle valve is open, the fuel is discharged from the throttle valve to a passage 88 leading to the afterburner.

The throttle valve 86 is of the "window" type having a sleeve 90 provided with a window 92 and a cylinder 94 provided with a window 96. The cylinder 94 is rotatable and movable longitudinally within the sleeve 90 whereby to adjust the size of the opening between the windows 92 and 96, this adjusting the volume of fuel flow through the throttle valve 86 to the afterburner inlet conduit 88. The cylinder 94 is rotated in the throttle valve sleeve by a lever 98 which is connected by motion transmitting means, indicated schematically by the line 100, to the pilot's power lever or control lever 102. The axial or longitudinal movement of the throttle valve cylinder 94 within the sleeve 90 is controlled automatically responsive to fluid pressure. That is, fluid at engine compressor discharge pressure is directed to a servo mechanism indicated generally by the reference numeral 104 through a conduit 106. A lever 108 operated by the servo unit 104 responsive to fluid pressure is mechanically connected with the throttle valve cylinder 94 to shift it longitudinally. Thus, the amount of fuel flowing to the afterburner in afterburner operation is controlled by manipulation of the pilot's power lever 102 and is also controlled or modified by servo means responsive to engine compressor discharge.

The afterburner fuel control system also includes a valve 110 which is disposed for fluid pressure responsive movement into and out of the afterburner inlet passage 88. A chamber 112 is defined on one side of the valve 110 and is connected as by a conduit 114 to the sequencing valve. If fluid is received in the chamber 112 from the sequencing valve at a high pressure, the valve 110 will be thrust into the afterburner fuel passage 88 to block the same and prevent the flow of fuel to the afterburner. Thus, the valve 110 functions as a shut-off valve. If the chamber 112 receives fluid from the sequencing valve at a relatively low pressure, the valve 110 will still be forced into the afterburner fuel passage 88 unless or until the fuel pressure therein reaches a known level. Thus, the valve 110 also functions as a device to insure minimum operating pressure in the passage 88 before opening the passage for flow to the afterburner.

The afterburner fuel system also includes a valve 116 for controlling the pressure across the throttle valve 86. The valve 116 is disposed for movement in a passageway 118 interconnecting the fuel inlet passage 84 and a recirculating or "interstage" passage 120. The valve 116 is biased by a spring 122 and fluid under pressure in a chamber 124 toward a closed position preventing flow from the fluid inlet passage 84 to the recirculating passage 120. The valve 116 is further biased toward the said closed position by fluid under pressure in a chamber 126 and acting upon a seat for the said spring. The chamber 124 receives fluid from a conduit 128 connected with the sequencing valve. When the fluid pressures in the chambers 124 and 126 are relatively low, the fuel pressure in the fuel inlet passage 84 is sufficient to move the valve 116 to an open position so that at least some of the fuel will flow from the passage 84 into the recirculating passage 120. The recirculating or "interstage" passage 120 returns the fuel to the multi-stage fuel pump, introducing the same thereto at an intermediate stage.

The valve 116 does not function merely as a by-pass valve which is either closed or fully open. During afterburner operation, the valve 116 may assume partially open positions, recirculating part of the fuel. At any partially open position there will be a substantial pressure drop in fuel flow from the passage 84 to the interstage passage 120 and, therefore, the interstage passage 120 can be considered as a medium or low pressure passage. The movement of the valve 116 in controlling the interstage or recirculating flow controls the pressure drop across the throttle valve 86.

The movement of the pressure regulating valve 116 to control throttle inlet pressure is influenced by a pressure responsive control device indicated generally by the reference numeral 132. The control device 132 comprises a diaphragm 134 disposed in a chamber 136 which is connected on one side of the diaphragm with the downstream side of the throttle valve and which is connected on the other side of the diaphragm with the upstream side of the throttle valve. Thus, in comparing the upstream and downstream pressures, the diaphragm 134 is moved within the chamber 136. Movement of the diaphragm 134 controls the opening at an orifice 138 in a conduit 140 extending to the chamber 126 which biases the upstream pressure regulating valve 116. The conduit 140 is connected with a conduit 142 extending to the sequencing valve.

Turning now to the sequencing valve as adapted for the afterburner fuel control system, it should be observed that the shuttle construction and operation are substantially the same as the construction and operation shown in Figs. 1–4. Therefore, needless repetition can be avoided by noting that the parts in the sequencing valve 10a used in the fuel control system which are similar to elements described in connection with Figs. 1–4 are identified by similar reference numerals but with the suffix "a" added thereto.

The only real difference in the construction of the sequencing valve 10 shown in Figs. 1–4 and the sequencing valve 10a shown in Fig. 5 and shown in greater detail in Figs. 6–9 is that the valve housing 16a is provided with a plurality of ports or passages to receive fluid conduits and the shuttles 12a and 14a are provided with extensions having lands which are movable relative to the said ports for the purpose of controlling fluid flow therebetween. More specifically, the housing 16a is adapted to receive the following fluid conduits for communication with its bore: conduit 150 connected to the interstage passage 120; conduit 152 connected to the fuel inlet passage 84; conduit 128 connected with the chamber 124 of the pressure regulating valve 116; conduit 154 connected with the afterburner fuel passage 88 on the upstream side of the shut-off valve 110; conduit 142 connected with the chamber 126 of the valve 116; and conduit 114 connected with the chamber 112 of the afterburner shut-off valve 110. The shuttle 12a is provided with an extension 156 in the bore of the housing 16a, the extension having suitable lands movable relative to the conduits 150, 152, 128, 154, 142 and 114, and the shuttle 14a is provided with an extension 158 having an internal passage 160.

The arrangement is such that when the sequencing valve 10a and its shuttles 12a and 14a are in the "A" position (Fig. 6) the interstage conduit 150 is blocked at the sequencing valve; the high pressure fuel conduit 152 is connected to the conduit 114 at the sequencing valve; the conduits 142 and 128 are connected at the sequencing valve with the vent conduit 54a through the internal passages 32a and 160; and the conduit 154 is blocked at the sequencing valve. Thus, in the "A" position of the sequencing valve, fluid at high pressure passes from the conduit 152 to the conduit 114 and into the chamber 112 of the shut-off valve, biasing the said shut-off valve 110 to closed position thereby preventing fuel flow into the afterburner through the passage 88. Also in the said "A" position where the conduits 128 and 142 are vented through the sequencing valve, the chambers 124 and 126 in the pressure regulating valve are vented so that the said pressure regulating valve 116 can be fully opened to recirculate the fuel from the passage 84 to the interstage passage 120.

In the "B" position of the sequencing valve 10a as shown in Fig. 7, there is no change in the valve connections as described in the foregoing paragraph.

In the "C" position as shown in Fig. 8, there is no change in the conduit connections from that just described in connection with the "A" position and the "B" position. However, it will be observed that the sequencing valve is disposed so that only slight additional upward movement of its shuttle 12a will cause the interstage conduit 150 to be connected with the conduit 114 and will cause the high pressure conduit 152 to be blocked. Thus, slight additional movement will cause fluid at the low interstage pressure to enter the chamber 112 of the shut-off valve. However, this reduction in pressure in the chamber 112 will not permit the shut-off valve 110 to open until the fuel builds up in the passage 88 on the upstream side of the shut-off valve.

This significant switching operation takes place in moving the sequencing valve 10a from the "C" position to the "D" position as shown in Fig. 9. When in the "D" position, the interstage conduit 150 is connected to the shut-off valve conduit 114, and the high pressure conduit 152 is connected to the conduit 142. The conduit 142 is no longer connected to drain and neither is the conduit 128, the conduit 128 being now connected to the conduit 154. Thus, in the "D" position the chamber 112 in the shut-off valve 110 still receives fluid at interstage pressure, but the chamber 124 of the by-pass valve receives fluid at the downstream pressure from the passage 88 and the chamber 126 receives fluid at the upstream or high pressure from the conduit 142 and the conduit 152 as modified at the control orifice 138. This will cause the pressure regulating valve 116 to be repositioned in the passageway 118, closing or substantially closing the said passageway and thereby increasing the fuel pressure in the passage 84 on the upstream side of the throttle valve 92. This will, of course, increase the discharge pressure from the throttle valve and will cause the shut-off valve 110 to be opened so that afterburner operation will start. Thus, afterburner operation is started by movement of the sequencing valve from the "C" position to the "D" position.

It will be obvious that the movement of the sequencing valve from the "D" position to the "C" position or from the "D" position to the "A" position will terminate afterburner operation. That is, when the sequencing value is moved to the "C" position or to the "A" position, the pressure in the regulating valve chambers 124 and 126 is reduced by venting the conduits 128 and 142 through the sequencing valve whereupon the regulating valve opens to permit fuel recirculation through the interstage conduit. At the same time, the sequencing valve connects the high pressure conduit 152 and the shut-off valve conduit 114 whereby to introduce high pressure to the shut-off chamber 112. This, of course, thrusts the shut-off valve 110 into blocking position in the afterburner inlet passage 88.

As described in connection with the disclosure of the shuttles shown in Figs. 1–4, the shuttles or shuttle valves 12a and 14a in the sequencing valve 10a are moved into their discrete positions "A"—"D" by operation of the valve devices 44a and 62a. That is, the two-position valve device 44a can be positioned to connect the conduit 40a to drain or to the high pressure source and the two-position solenoid operated valve 62a can be operated to open or close the orifice 56a. Preferably, the pilot's control lever is connected by motion transmitting means indicated schematically by the reference 170 to the two-position valve device 44a so that it will put said device in one position as the control lever is moved in one direction and place it in the other position as the control lever is moved in the other direction. That is, when the pilot's control lever is moved upwardly or forwardly in its quadrant or guide slot 172 as shown in Fig. 10 and it reaches the position indicated by the line 174, the valve device 44a will be positioned to connect the conduit 40a to drain. At all positions of the control lever 102 in the quadrant 172 above or forwardly of the line 174, the conduit 40a receives fluid at high pressure and when the said control lever is in any position below or rearwardly of the line 74, the conduit 40a is connected to the drain.

Provision is also made for the control lever 102 to close switch means (not shown in Fig. 10) which will cause the solenoid 70 in the valve device 62 to be energized and thereby to open the orifice 56 whenever the control lever 102 is moved from left to right in the quadrant 172 across the position indicated by the line 176. (The left side of the quadrant embraces the range of main engine operation and the overlapping right side embraces afterburner operation.) And, the said switch means is arranged to open when the control lever is moved to the left of the line 176. Therefore, in all positions of the control lever within the quadrant to the right of the line 176, the orifice 56 will be open and in all positions of the control lever to the left of the line 176, the orifice 56 will be closed.

Obviously, the aforesaid switch means, such as the switch 180 (Fig. 5), for selectively closing and opening the power circuit to the valve solenoid 70 can be remote from the control lever and its quadrant and can be manually operated quite apart from operation of the control lever.

Assume now that the electrical system is operating properly and that the power lever 102 in the quadrant 172 is disposed in the lower left-hand end thereof, the "off" position. The valve device 44a will be positioned to connect the conduit 40a with drain and the orifice 56 will be closed because the solenoid 70 in the valve 62 is de-energized. Under this condition, the sequencing valve will be in the "B" position as shown in Fig. 2 and as shown in Fig. 7. If the pilot advances the control lever 102 in the quadrant 172 to the position indicated by the line 174, the valve device 44a will be repositioned to connect the conduit 40a with the source of fluid at high pressure causing the sequencing valve to assume the "C" position as shown in Fig. 3 and as also shown in Fig. 8. Now, if the pilot wants to operate the afterburner, he moves the power lever 102 to the right and forwardly in the right-hand side of the quadrant 172 and in so doing passes the quadrant position indicated by the line 176 wherein the valve solenoid 70 is energized to open the orifice 56. This places the sequencing valve in the "D" position as shown in Figs. 4 and 9 and it conditions the afterburner fuel control system shown in Fig. 5 for afterburner operation as previously described.

Having completed afterburner operation, the pilot pulls the power lever rearwardly and to the left in the quadrant 172 across the position indicated by the line 176 and this will deenergize the solenoid whereby to close the orifice 56 and place the sequencing valve in the "C" position as shown in Figs. 3 and 8. If the pilot continues to retract the power lever to the position in the quadrant indicated by the line 174, the valve device 44a will be repositioned to connect the conduit 40a with drain. This will place the sequencing valve in the "B" position.

From the foregoing description it will be understood that movement of the power lever 102 over the full range permitted by the quadrant or guide slot 172 will effect movement of the sequencing valve through its B, C and D positions with the afterburner starting and stopping in movement of the sequencing valve through its B, C and In other words, the afterburner will be on whenever the lever is moved to the right of the position marked by the line 176. Under these normal operating conditions, the pilot has complete control and selection of afterburner operation. Thus, he can normally avoid inadvertent or undesired afterburner operation. In addition, the latching function of the valve prevents inadvertent afterburner operation even in the event of failure of the electrical switch 180 to operate properly.

That is, in the event the switch 180 fails to open after afterburner operation and when the power lever is moved from right to left across the position 176, the orifice 56a will remain open, and when the lever 102 is moved downwardly past the position 174, the valve 44a is connected to drain. This places the valve 10a in the "A" position and it cannot be removed therefrom until the switch 180 is again opened to close the orifice 56a. This permits the pilot to utilize the full scope of his quadrant for main engine operation without fuel consuming afterburner operation. In other words, the afterburner is used only under extraordinary circumstances of short duration, and in the event of electrical failure afterburner operation and consequent high fuel consumption are avoided.

The same safety failure is provided when the switch 180 is located remote from the quadrant 172 for independent pilot operation.

The invention claimed is:

1. A valve movable between two positions responsive to fluid pressure signals and comprising, a housing having a bore and at least two passages opening into the bore, a shuttle movable in the bore between the said two positions to respectively permit and prevent flow between the passages and having one portion with an exposed area which cooperates with the bore to define a first chamber, the said one portion having passage means communicating with the said first chamber, the said shuttle having another portion with an exposed area less than the exposed area of the said one portion cooperating with the bore to define a second chamber, a first conduit opening into the bore and communicating with the said first chamber but being blocked by the shuttle at one of its said two positions, a second conduit adapted for connection with a source of fluid under pressure and communicating with the said second chamber, a third conduit opening into said bore and into said passage means when the shuttle is in its said one position, and means for connecting said first and third conduits with a source of fluid under pressure of the same magnitude as the first mentioned source of fluid under pressure and with a drain and operable to transmit fluid pressure signals therefrom selectively.

2. A valve movable between two positions responsive to fluid pressure signals and comprising, a housing having a bore and at least two passages opening into the bore, a shuttle reciprocable in the bore between the said two positions to respectively permit and prevent flow between the passages and having one end portion with an exposed area which cooperates with the bore to define a first chamber, the said one end portion having passage means communicating with the said first chamber, the said shuttle having another portion with an exposed area less than the exposed area of the said one portion cooperating with the bore to define an annular chamber, a first conduit opening into the bore for communication with the said first chamber but being blocked by the shuttle in one of its said two positions, a second conduit adapted for connection with a source of fluid under pressure and opening into the bore for communication with the said annular chamber, a third conduit opening into said bore and into said passage means when the shuttle is in its said one position, and means for connecting said first and third conduits with said source of fluid under pressure and with a drain and operable to transmit fluid pressure signals therefrom selectively.

3. A valve adapted for connection with a source of fluid under pressure and for connection with a drain to receive high and low fluid pressure operating signals and comprising a housing having a bore which is closed at one end and also having at least two passages opening into the bore, a shuttle reciprocable within the bore and having means adapted to permit flow between the passages in one position of the shuttle and to prevent flow therebetween in another position of the shuttle, one end of the shuttle being recessed to define an internal chamber with the closed end of the bore and the other end of the shuttle being reduced to define an annular chamber with the wall of the bore, a first conduit opening into the bore for communication with the internal chamber but being blocked by the shuttle in the said one position thereof, a second conduit adapted for connection with said source and opening into said annular chamber, and a third conduit opening into said bore and communicating with said internal chamber when said shuttle is in its said one position, and means connecting said first and third conduits with said source and said drain and operable to transmit pressure signals therefrom selectively, the shuttle being movable into said one position responsive to fluid pressure in said annular chamber when the first and third conduits receive low pressure signals and the shuttle being movable from said one position toward said other position responsive to fluid pressure in said internal chamber when said third conduit receives a high pressure signal.

4. A valve adapted for connection with a source of fluid under pressure and for connection with a drain to receive high and low fluid pressure operating signals and comprising a housing having a bore which is closed at one end and also having at least two passages opening into the bore, a shuttle reciprocable within the bore between two positions and having means adapted to permit flow between the passages in one position of the shuttle and to prevent flow therebetween in the other position of the shuttle, one end of the shuttle being provided with a recess to define an internal chamber with the closed end of the bore and having a radial port communicating with the internal chamber, and the other end of the shuttle being reduced to define an annular chamber with the wall of the bore, a first conduit having a radial opening into the bore for communicating with the internal chamber but being blocked by the shuttle in the said one position thereof, a second conduit adapted for connection with said source and opening into said annular chamber, a third conduit opening radially into said bore and into said port when said shuttle is in its said open position, and means connecting said first and third conduits with said source and said drain and operable to transmit pressure signals therefrom selectively.

5. A valve adapted for connection with a source of fluid under pressure and for connection with a drain to receive high and low fluid pressure operating signals and comprising a housing having a bore which is closed at one end and also having at least two passages opening into the bore, a shuttle reciprocable within the bore between two positions and having means adapted to permit flow between the passages in one position of the shuttle and to prevent flow therebetween in the other position of the shuttle, one end of the shuttle being provided with a recess to define an internal chamber with the closed end of the bore and having a radial port communicating with the internal chamber, and the other end of the shuttle being reduced to define an annular chamber with the wall of the bore, a first conduit opening radially into the bore adjacent said port but being blocked by the shuttle in the said one position thereof, a second conduit adapted for connection with said source and opening into said annular chamber, a third conduit opening radially into said bore and communicating with said port when said shuttle is in its said one position, and means connecting said first and third conduits with said source and said drain and operable to transmit pressure signals therefrom selectively, the shuttle being movable into said one position responsive to fluid pressure in said annular chamber when the first and third conduits receive low pressure signals and the shuttle being movable from said one position toward said other position responsive to fluid pressure in said internal chamber to effect communication between said first conduit and said port when said third conduit receives a high pressure signal.

6. A valve as defined in claim 3 wherein the means connecting said first and third conduits with said source and said drain to transmit pressure signals therefrom selectively comprises a first valve device connecting said first conduit with said source and said drain, conduit means connecting said third conduit and said source and having a vent orifice, and a second valve device operable selectively to open and to close said vent orifice.

7. A valve as defined in claim 4 wherein the means connecting said first and third conduits with said source and said drain to transmit pressure signals therefrom selectively comprises a first valve device connecting said first conduit with said source and said drain, conduit means connecting said third conduit and said source and having a vent orifice, and a second valve device operable selectively to open and to close said vent orifice.

8. A valve as defined in claim 5 wherein the means connecting said first and third conduits with said source and said drain to transmit pressure signals therefrom selectively comprises a first valve device connecting said first conduit with said source and said drain, conduit means connecting said third conduit and said source and having a vent orifice, and a second valve device operable selectively to open and to close said vent orifice.

9. In a fuel control system, the combination comprising a main fuel conduit connectible with a source of fuel under pressure, a shut-off valve having a fluid chamber and movable into said main conduit responsive to pressure in its said chamber, a source of fluid under pressure, and a control valve connected to said fluid source and connected to a drain whereby to receive high and low pressure operating signals respectively, the said control valve comprising a housing having a bore which is closed at one end and also having two passages opening into the bore, first conduit means connecting one of the said passages and said fuel conduit on the upstream side of said shut-off valve, second conduit means connecting the other of said passages and the chamber of said shut-off valve, a shuttle reciprocable within the bore and having means adapted to permit flow between the passages in one position of the shuttle and to prevent flow therebetween in another position of the shuttle, one end of the shuttle being recessed to define an internal chamber with the closed end of the bore and the other end of the shuttle being reduced to define an annular chamber with the wall of the bore, a first conduit opening into the bore for communication with the internal chamber but being blocked by the shuttle in the said one position thereof, a second conduit connected with said fluid source and opening into said annular chamber, a third conduit opening into said bore and communicating with said internal chamber when said shuttle is in its said one position, and means connecting said first and third conduits with said fluid source and said drain and operable to transmit pressure signals therefrom selectively, the shuttle being movable into said one position responsive to pressure in said annular chamber when the first and third conduits receive low pressure signals and the shuttle being movable from said one position toward said other position responsive to pressure in said internal chamber when said third conduit receives a high pressure signal.

References Cited in the file of this patent

UNITED STATES PATENTS

| | | |
|---|---|---|
| 2,396,787 | Hawthorne | Mar. 19, 1946 |
| 2,621,885 | Schmitt | Dec. 16, 1952 |
| 2,670,714 | Gay | Mar. 2, 1954 |
| 2,841,168 | Levetus | July 1, 1958 |

UNITED STATES PATENT OFFICE

CERTIFICATE OF CORRECTION

Patent No. 2,934,306            April 26, 1960

Fredrick P. Evans et al.

It is hereby certified that error appears in the printed specification of the above numbered patent requiring correction and that the said Letters Patent should read as corrected below.

Column 9, line 73, strike out "of the sequencing valve through its B, C and" and insert instead -- from positions C to D and D to C, respectively. --; column 11, line 46, for "open position" read -- one position --.

Signed and sealed this 27th day of September 1960.

(SEAL)
Attest:

KARL H. AXLINE

Attesting Officer

ROBERT C. WATSON

Commissioner of Patents